UNITED STATES PATENT OFFICE.

WILLIAM W. BRASINGTON, OF MARIETTA, OHIO.

PAINT.

SPECIFICATION forming part of Letters Patent No. 713,846, dated November 18, 1902.

Application filed November 8, 1901. Serial No. 81,620. (No specimens.)

*To all whom it may concern:*

Be it known that I, WILLIAM W. BRASINGTON, a citizen of the United States, residing at Marietta, in the county of Washington and State of Ohio, have invented a new and useful Composition of Matter for Paint, of which the following is a specification.

My invention relates to a composition consisting of a mixture of ingredients which when thoroughly commingled constitute a paint. This invention has for its principal object the production of a material which is more waterproof, elastic, and adhesive than any heretofore devised; and to these ends it consists, primarily, in the compounding of a paint body from refined tar, commercially known as "pure refined coal-tar," and other ingredients in substantially the proportions hereinafter stated.

As is well known, paints applied to various substances are exposed to weather and should be proof thereagainst as well as adhesive to the material upon which they are applied. The paint must also possess sufficient elasticity to enable it to accommodate itself without injury to the expansion or contraction of the surface to which it may be applied, caused by the changes of temperature.

The base of the composition, as above stated, is refined tar, to which is added an ingredient commercially known as "No. 10 grade rubber-cement." By "refined coal-tar" is meant the crude tar, (the product of hard coal obtained in the process of making coke.) This is put into stills and all impurities and water are extracted. Then the residuum is washed by running through cold water, giving a product about the consistency of heavy molasses. This product will not color water nor taste in water from cisterns where this paint is used, while refined tar from open distillation from gas coal-tar both tastes in and discolors the water. The crude coal-tar contains about twenty-five per cent. of acids and other impurities, which are all taken from the refined coal-tar that I use in the manner described. The refined coal-tar can be purchased in the open market. This is my reason for using this superior article to obtain a paint substantially as described.

No. 10 grade rubber-cement is a product of crude rubber in the fluid state in the consistency of molasses. No. 10 denotes the highest grade and merely a name to designate, as No. 1 would be the lowest grade made. This is bought in the open market and, as I understand, is made under patent to Goodyear. It evaporates and leaves a pure rubber in a few hours after being left in the open air. In other words, it is fluid rubber, such as is called "patching-cement." These are dissolved in gasolene, as hereinafter described, the gasolene being a ready solvent of both the grade of cement and the tar used in my composition.

The proportion of each and the manner of compounding are as follows: To four gallons of refined coal-tar I add one gallon of No. 10 grade rubber-cement, the cement having previously been dissolved in one pint of gasolene. The coal-tar and dissolved rubber-cement are now thoroughly mingled by agitation, after which I add this thoroughly-commingled compound to eight times the amount of the refined coal-tar and rubber-cement, or forty gallons, and five gallons of gasolene, making approximately forty-nine gallons of mixture to one gallon of rubber-cement, the whole to be mingled by agitation without heating.

It is apparent that the same proportion may be used in smaller quantities, also that the proportion may be slightly changed without materially changing the result.

It will be observed that the main idea is to avoid heating, which destroys the properties of the rubber, these properties of the rubber being retained by the cold process, and also avoiding the use of oil, minerals, varnishes, sulfur, litharge, and the like as employed in other hard-tar paints, as it is well known that dead-oils, varnishes, sulfids of carbon, &c., have a tendency to impair the life of the refined-tar base for use on metal.

By the use of gasolene, which is a solvent to both of the ingredients constituting the base, I retain all the properties of the mixture, the gasolene acting as a drier and imparting to the paint a tendency to flow smoothly, as in ordinary paint, at the temperature of the air, and also giving the paint a bright gloss, obtainable in no other way, setting it almost instantly, and leaving its full life as a protection to the surface to which it is applied.

It is well known that in ordinary coal-tar and rubber paint, where oils, turpentine, benzin, or chlorid of carbon are used, the gloss is partially destroyed, and it is necessary to add copal or other varnishes afterward to regain it, whereas I retain the gloss, as above described, without the addition of deleterious substances.

By the use of the above combination metal is given a protection that is at once elastic, waterproof, and adhesive without the use of oils, varnishes, minerals, or solvents injurious to the refined-tar base, as in other paint.

I am aware that a composition consisting of refined gas coal-tar, rubber-pulp, dead-oil, litharge, and copal has been used for the same purpose and that a patent therefor was granted to William B. Grover, March 11, 1890, and numbered 423,047. I am also aware that a compound was patented February 11, 1873, numbered 135,865, for preserving rope and cordage, consisting of raw rubber dissolved in oil of tar, benzin, turpentine, or other solvents; but I do not believe that a paint has been compounded by my present method and consisting of the ingredients in substantially the proportions set forth.

Having thus described my invention, what I claim as new, and desire to secure by Letters Patent, is—

1. A paint compound consisting of pure refined coal-tar, gasolene and rubber-cement.

2. A paint compound consisting of forty-four parts, pure refined coal-tar, five parts gasolene, and one part No. 10 grade rubber-cement.

3. A paint compound composed of refined tar, rubber-cement, and a solvent not injurious to the tar base.

4. A paint compound composed of refined tar, rubber-cement, and a solvent not injurious to the tar base, said ingredients mingled by agitation, without heating.

5. The herein-described method of manufacturing paint consisting of mixing tar, rubber-cement and a solvent together, mingling these ingredients thoroughly without the aid of artificial heat.

In testimony whereof I have signed this specification in the presence of two subscribing witnesses.

WILLIAM W. BRASINGTON.

Witnesses:
RUFUS A. UNDERWOOD,
BERTHA RYAN.